United States Patent
Reusch (10) Patent No.: US 10,837,758 B2
(45) Date of Patent: Nov. 17, 2020

(54) DEVICE AND METHOD FOR DETERMINING A HEIGHT OF AN AGRICULTURAL PRODUCT

(71) Applicant: YARA INTERNATIONAL ASA, Oslo (NO)

(72) Inventor: Stefan Reusch, Dülmen (DE)

(73) Assignee: YARA INTERNATIONAL ASA, Olso (NO)

(*) Notice: Subject to any disclaimer, the term of this patent is extended or adjusted under 35 U.S.C. 154(b) by 0 days.

(21) Appl. No.: 16/472,999

(22) PCT Filed: Dec. 27, 2017

(86) PCT No.: PCT/EP2017/084608
§ 371 (c)(1),
(2) Date: Jun. 24, 2019

(87) PCT Pub. No.: WO2018/122237
PCT Pub. Date: Jul. 5, 2018

(65) Prior Publication Data
US 2020/0088509 A1   Mar. 19, 2020

(30) Foreign Application Priority Data
Dec. 27, 2016   (EP) .................................... 16206921

(51) Int. Cl.
*G06K 9/00* (2006.01)
*G06T 7/00* (2017.01)
(Continued)

(52) U.S. Cl.
CPC .............. *G01B 11/026* (2013.01); *A01G 7/00* (2013.01); *G01B 17/00* (2013.01);
(Continued)

(58) Field of Classification Search
CPC ...... G01B 11/026; G01B 17/00; G01B 21/04; G01B 5/0035; H04N 13/296;
(Continued)

(56) References Cited

U.S. PATENT DOCUMENTS

| 2012/0113225 A1* | 5/2012 | Deppermann ......... G01B 21/20 348/46 |
| 2014/0378184 A1 | 12/2014 | Thorat |

(Continued)

FOREIGN PATENT DOCUMENTS

| DE | 10 2008 009 753 | 9/2009 |
| EP | 1 493 316 | 1/2005 |

(Continued)

OTHER PUBLICATIONS

International Search Report dated Feb. 9, 2018 in International (PCT) Application No. PCT/EP2017/084608.

*Primary Examiner* — Susan E. Hodges
(74) *Attorney, Agent, or Firm* — Wenderoth, Lind & Ponack, L.L.P.

(57) ABSTRACT

In a method and device for measuring a height of an agricultural product above ground using a mobile communications device, the method includes positioning the communications device above the agricultural product and determining a distance between the communications device and the agricultural product using a built-in sensor of the communications device. The height of the agricultural product is determined on the basis of the determined distance.

22 Claims, 6 Drawing Sheets

(51) Int. Cl.
*H04N 13/239* (2018.01)
*G01C 11/00* (2006.01)
*G01B 11/02* (2006.01)
*H04N 13/296* (2018.01)
*H04N 5/232* (2006.01)
*A01G 7/00* (2006.01)
*G01B 17/00* (2006.01)
*B25J 11/00* (2006.01)
*B64C 39/02* (2006.01)
*H04N 13/00* (2018.01)

(52) U.S. Cl.
CPC ..... *H04N 5/232121* (2018.08); *H04N 13/239* (2018.05); *H04N 13/296* (2018.05); *B25J 11/00* (2013.01); *B64C 39/02* (2013.01); *B64C 2201/123* (2013.01); *H04N 2013/0081* (2013.01)

(58) Field of Classification Search
CPC ........... H04N 13/239; H04N 5/232121; H04N 2013/0081; A01G 7/00; B25J 11/00; B64C 39/02; B64C 2201/123; G06K 9/00657; A01B 79/005
USPC ......................................................... 348/50
See application file for complete search history.

(56) References Cited

U.S. PATENT DOCUMENTS

| | | | |
|---|---|---|---|
| 2016/0223511 A1* | 8/2016 | Koshnick | A01C 21/007 |
| 2017/0034986 A1* | 2/2017 | Koch | G01S 19/13 |
| 2017/0090271 A1* | 3/2017 | Harris | G06K 9/0063 |
| 2017/0223947 A1* | 8/2017 | Gall | G01N 21/4738 |
| 2018/0025480 A1* | 1/2018 | Dingle | G06T 7/001 382/110 |
| 2018/0168141 A1* | 6/2018 | Tanner | B25J 9/1694 |

FOREIGN PATENT DOCUMENTS

| | | |
|---|---|---|
| NZ | 286786 | 7/1998 |
| WO | 2006/009472 | 1/2006 |
| WO | 2013/041636 | 3/2013 |
| WO | 2013/087052 | 6/2013 |

* cited by examiner

DEVICE AND METHOD FOR DETERMINING A HEIGHT OF AN AGRICULTURAL PRODUCT

FIELD OF THE INVENTION

The invention relates to a device and method for determining a plant status. More in particular, the invention relates to a device and method for determining a height of an agricultural product. More in particular, the invention relates to a device and method for determining a quantity of an agricultural product.

BACKGROUND TO THE INVENTION

It is known to measure height of grass, especially in grass-based farming system, e.g. dairy industry. Grass for grazing can provide the basis of sustainable livestock systems, as grazed grass is a cheap source of nutrients for ruminants. Therefore, high grass output per hectare is desired.

Leaf production for grass is understood to be maximized by grazing to between 3.5 and 4 cm of residual height. By keeping the pasture in a growing state, a higher quality of grass will be produced in a green leafy base. Pre-grazing height can e.g. be between 8 and 9 cm, corresponding to three leaves approximately. If such grass is grazed down to between 3.5 and 4 cm, growth will be expected at 16,000 kg DM/ha.

There are a number of techniques available for measuring grass. A first example comprises simply Cutting, Drying, Weighing Shears, Quadrant, Scales. However this method is slow and laborious. Another substantially mechanical system is a Rising Plate Meter. However, examples according to this technique are cumbersome to carry and to use accurately. More recently, electronic systems have been developed, which rely upon ultrasonic devices for carrying out measurements. However, such systems require the use of purpose-built delicate measurement equipment.

PRIOR ART

WO 2013/041636 A1 (Monford AG Systems Ltd, 28 Mar. 2013) discloses a system and method comprising a single ultrasonic transducer for measuring agricultural parameters, for example the height or quantity of an agricultural product such as grass. The system is preferably attached to footwear of a walking person and comprises of two modules (a data processing unit and a sensor unit) while the measured agricultural parameters are communicated to a remote processing means. In EP 2862429 A1 (22 Dec. 2015), the same applicant has also disclosed an ultrasound ranging system and method for measuring the quantity of an agricultural product, comprising a set of ultrasonic transducers.

WO 2013/087052 A1 (Yara International ASA, 20 Jun. 2013) discloses a method and apparatus for contactlessly determining plant parameters and for processing this information into a control variable for fertilization, watering and/or plant protection, wherein a digital stereo image of part of a plant is recorded and the plant parameters (a.o. height of the plant) are determined from these images by means of image analysis.

WO 2006/009472 A2 (Gallagher Group Ltd., 26 Jan. 2006) discloses a pasture meter, adapted to indicate the amount of vegetative material in a region, based on the emission and detection of (ultrasonic) sound bursts.

EP1493316 A1 (Amazonen-Werke H. Dryer GmbH & Co. KG, 5 Jan. 2005) discloses a device comprises a sensor that transmits a signal via a transmitter to the receiver of an onboard computer. The sensor is an optoelectronic distance sensor with which the height of a crop can be determined. The onboard computer determines crop density using a program loaded in its memory.

NZ 286786 A (Van Den Hout Filip, 28 Jul. 1998) discloses a pasture meter having a plate and a probe mounted together such that relative movement there between can take place, the pasture meter being characterized by an electronic distance sensor to sense and indicate the extent of relative movement between the probe and the plate.

SUMMARY OF THE INVENTION

It is an objective to provide an improved method for measuring an agricultural product, such as grass. The grass can e.g. be pasture grass. However, it is also possible that the grass is lawn grass, e.g. of a golf course, sports stadium or a park. It will be appreciated that the method can also be used for determining a height of other agricultural products, such as kale or other crop. It is an object to provide method for measuring an agricultural product using readily available equipment, possibly modified using dedicated software.

According to an aspect, a method is provided for measuring a height of an agricultural product above ground using a mobile communications device. The mobile communications device can e.g. be a smartphone, tablet, laptop, or the like. Using the mobile communications device provides the advantage that a device is used that is readily available. Moreover, the mobile communications device is standard equipment for any farmer, gardener or groundsman. The method includes positioning the communications device above the agricultural product, e.g. over the agricultural product, and determining a distance between the communications device and the agricultural product using a built-in sensor of the communications device. The method includes determining the height of the agricultural product on the basis of the determined distance. Since a built-in sensor of the mobile communications device is used, no dedicated equipment, or dedicated add-on sensor is required. The standard mobile communications device suffices.

Optionally, the built-in sensor is a camera. It is noted that a camera is a standard sensor on mobile communications devices.

Optionally, the height is determined on the basis of focus distance information of an autofocus unit of the camera. Some autofocus units use light, e.g. infrared light, for determining a distance from the camera to an object. They can produce a pulse of light, e.g. infrared light, and measure the amount that is reflected back and/or the time it takes for the light to return, then use this information to determine the distance. Other autofocus units can rely on determining image contrast and changing camera lens position while finding optimum contrast. In such autofocus units, the distance between the object and the camera is related to the position of the lens at focus, and can e.g. be retrieved after calibration of the position of the lens at focus for various object-camera distances.

Optionally, the height is determined on the basis of light intensity of light, generated by an illumination unit of the communications device, such as a flash light, reflected off the agricultural product.

Optionally, the height is determined on the basis of distance information determined from a stereographic image obtained by the camera. A stereographic image includes a first image and a second image taken at an offset in position and/or angle. The first and second image of the stereographic image may be obtained by one and the same camera, e.g. the one after the other. Hence, the stereographic image contains distance information to objects appearing in the image. The distance from the agricultural product to the camera can be determined from the stereographic image.

Optionally, the camera is a three-dimensional, 3D, camera. The height can be determined on the basis of distance information determined from a three dimensional image obtained by the 3D camera. The distance from the agricultural product to the camera can be determined from the 3D image.

Optionally, the built-in sensor is a microphone. It is noted that a microphone is a standard sensor on mobile communications devices.

Optionally, the height is determined on the basis of time-of-flight measurement of a sound generated by a speaker of the communications device. The sound may be a sound pulse. The sound may be ultrasound.

According to an aspect the mobile communications device is mounted to a support at a substantially constant distance from the ground. The support can e.g. be footwear, a walking aid, a user vehicle, a post, a gate, a fence, a mobile robot, a drone aerial vehicle, an animal, or the like. The support can e.g. be a stick, such as a walking stick, a boot, or a leg. The mobile communications device being mounted to a support at a substantially constant distance from the ground, provides the advantage that the height of the agricultural product above the ground is directly related to the distance between the mobile communications device and the top of the agricultural product. It will be appreciated, however, that it is also possible to hold the mobile communications device e.g. by hand, for instance when the user takes care to keep the mobile communications device at a constant distance relative to the ground. Thereto, the user may e.g. keep the mobile communications device at arm's length with the arm stretched in downward direction.

Optionally, the support is arranged for mounting the mobile communications device thereto at a plurality of different positions, at different distances from the ground. The different mounting positions can be associated with different measurement ranges. A first measurement range can e.g. for agricultural product heights of from 0 to 2 cm. A second measurement range can e.g. for agricultural product heights of from 1 to 30 cm. A third measurement range can e.g. for agricultural product heights of from 20 to 200 cm. However, other measurement ranges are possible.

According to an aspect, the method includes automatically triggering the built-in sensor on the basis of an angular orientation of the communications device. The mobile communications device may include an angle sensor, such as a gyroscope. Tilting of the communications device may then be used to automatically trigger taking of an image or recording of a sound.

Especially when the mobile communications device is mounted to a support that makes a tilting motion, such as a walking stick or a boot, the tilting motion can be used for triggering.

According to an aspect, the method includes automatically triggering the built-in sensor on the basis of an acceleration of the communications device. The mobile communications device may include an accelerometer.

Optionally, the method includes automatically triggering the camera to capture a first image when the communications device is in a first angular position and to capture a second image when the communications device is in a second angular position, the first and second images together forming the stereographic image. This can easily be performed when the mobile communications device is connected to an object that makes a tilting motion, such as a walking stick or boot. Then, the mobile communications device is alternately tilted forward and backward while walking on the ground. Also, the tilting provides the advantage that the stereographic image can easily be obtained since the object, e.g. the walking stick or boot, remains pointed at a fixed point, while the communications device changes position and angle. Hence, the mobile communications device occupies locations that are ideal for taking a first and second image making up the stereographic image.

According to an aspect, the method includes calibrating the height determination on bare ground. Holding the mobile communications device above bare ground allows to determine a reference distance between the device and the ground. Since the ground is bare, the distance will be associated with a height of agricultural products equaling zero. Hence, the reference distance can be used a reference when determining the height of actual agricultural product. It will be appreciated that, if during measurement the mobile communications device is mounted to a support, the communications device preferably is mounted to the same support, at the same position, during calibrating.

According to an aspect, the method includes storing a record including data representative of the determined height in a memory of the communications device and/or in a database in communication with the communications device. Hence, the measured height is available for later inspection and/or use.

Optionally, the method includes determining a position of the communications device, using a built-in position determining unit, such as a GPS unit, and storing data representative of the position in the record. Hence, the record can contain data representative of the determined height of the agricultural product and the location at which said height was determined. Optionally, the height is determined at a plurality of positions. A record may be stored for each of the positions.

According to an aspect, the method includes storing in a memory of the communications device, and/or in a database in communication with the communications device, data representative of an area of land on which the height of the agricultural product is to be determined. It is, for instance, possible to mark the area of land on a map on a screen, such as a touch-screen, of the mobile communications device. Such marking can include drawing a perimeter contour around the area of land. Alternatively, or additionally, it can be possible to demarcate the area of land by physically moving the mobile communications device along the perimeter of the area of land, and storing locations, such as GPS coordinates, of the perimeter. Alternatively, or additionally, data representative of the perimeter of the area of land can be download by or uploaded to the mobile communications device or the database. Hence, it is possible to identify an area of land, e.g. a predetermined pasture, in which the height of the agricultural product is to be determined. It will be appreciated that the above mentioned record(s) can include an indication of the area of land, e.g. a name and/or number.

Optionally, the method includes estimating a height of the agricultural product for any position within the area on the basis of the height determined at the plurality of positions. Such estimating can include using interpolation and/or extrapolation. For example, it is possible to determine the height of the agricultural product at a plurality of positions within the area of land. The height of the agricultural product can be interpolated between the height determined at the individual locations. The height of the agricultural product between a determination position and the perimeter of the area of land can e.g. be estimated by extrapolation. Alternatively, or additionally, the height of the agricultural product can be estimated by averaging of the individual determined heights.

Optionally, the method includes estimating a quantity of agricultural product within the area. The quantity, e.g. in kg DM or kg DM/ha, can e.g. be determined by multiplying the determined height by an empirical factor. Optionally, the method includes calculating, using a processing unit of the communications device, a quantity of the agricultural product on the basis of the determined height. Optionally, the method includes calculating, using a processing unit of a remote processing unit in communication with the mobile communications device, a quantity of the agricultural product on the basis of the determined height.

Optionally, the method includes visually representing data, such as determined height(s), the estimated height(s) and/or the estimated quantity on a screen, such as a touch screen) of the mobile communications device. The data may be represented in a color-coded or gray-scale map. The data may e.g. be represented in overlay on a representation of a geographical map of the area of land.

Optionally, the method includes estimating a nutritional status of the agricultural product on the basis of a first height determined at a first moment in time and a second height determined at a second moment in time. The increase in height during the time between the first and second moments can be indicative of the nutritional status of the agricultural product. Slow growth can e.g. be indicative of poor nutritional status. Optionally, the method including supplying water and/or nutrients to the agricultural product on the basis of the estimated nutritional status. It will be appreciated that the nutritional status can be determined in dependence of a position within an area of land, as described above for the height.

Optionally, the method including estimating an optimum moment for harvesting and/or mowing (including grazing) of the agricultural product on the basis of a first height determined at a first moment in time and a second height determined at a second moment in time.

According to an aspect, a mobile communications device is provided having a built-in sensor and a processing unit. The processing unit is arranged for determining a distance between the communications device and an agricultural product using the built-in sensor of the communications device. The processing unit can be arranged for determining the distance between the communications device and the agricultural product above which the communication device is held using the built-in sensor of the communications device. The processing unit is arranged for determining the height of the agricultural product on the basis of the determined distance.

Optionally, the built-in sensor is a camera, and the processing unit is arranged for determining the height on the basis of one or more of:

focus distance information of an autofocus unit of the camera;

light intensity of light, generated by an illumination unit of the communications device, reflected off the agricultural product;

distance information determined from a stereographic image obtained by the camera; or distance information determined from a three dimensional image obtained by the camera.

Optionally, the camera is a 3D-camera.

Optionally, the built-in sensor is a microphone, and the processing unit is arranged for determining the height on the basis of time-of-flight measurement of a sound generated by a speaker of the communications device.

Optionally, the mobile communications device includes a memory and/or is arranged for being in communication with a database, wherein the processing unit is arranged for storing a record including data representative of the determined height in the memory and/or database.

Optionally, the mobile communications device includes a position determining unit, wherein the processing unit is arranged for storing data representative of the position of the communications device in the record.

According to an aspect is provided a system including a mobile communications device as described above, and a support for supporting the communications device at a predetermined distance above the ground.

According to an aspect is provided a support for supporting the communications device at a predetermined distance above the ground for determining a distance between the communications device and an agricultural product above which the communication device is held using s built-in sensor of the communications device.

According to an aspect is provided a computer program product including software code portions arranged for, when run on the processing unit of a mobile communications device causing the device to determine a distance between the communications device and an agricultural product above which the communication device is held using a built-in sensor of the communications device, and to determine the height of the agricultural product on the basis of the determined distance.

Optionally the computer program product is arranged to operate under the Android operating system, iOS operating system, and/or Windows operating system.

It will be appreciated that any of the aspects, features and options described in view of the method apply equally to the mobile communications device, system, support and computer program product and vice versa. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
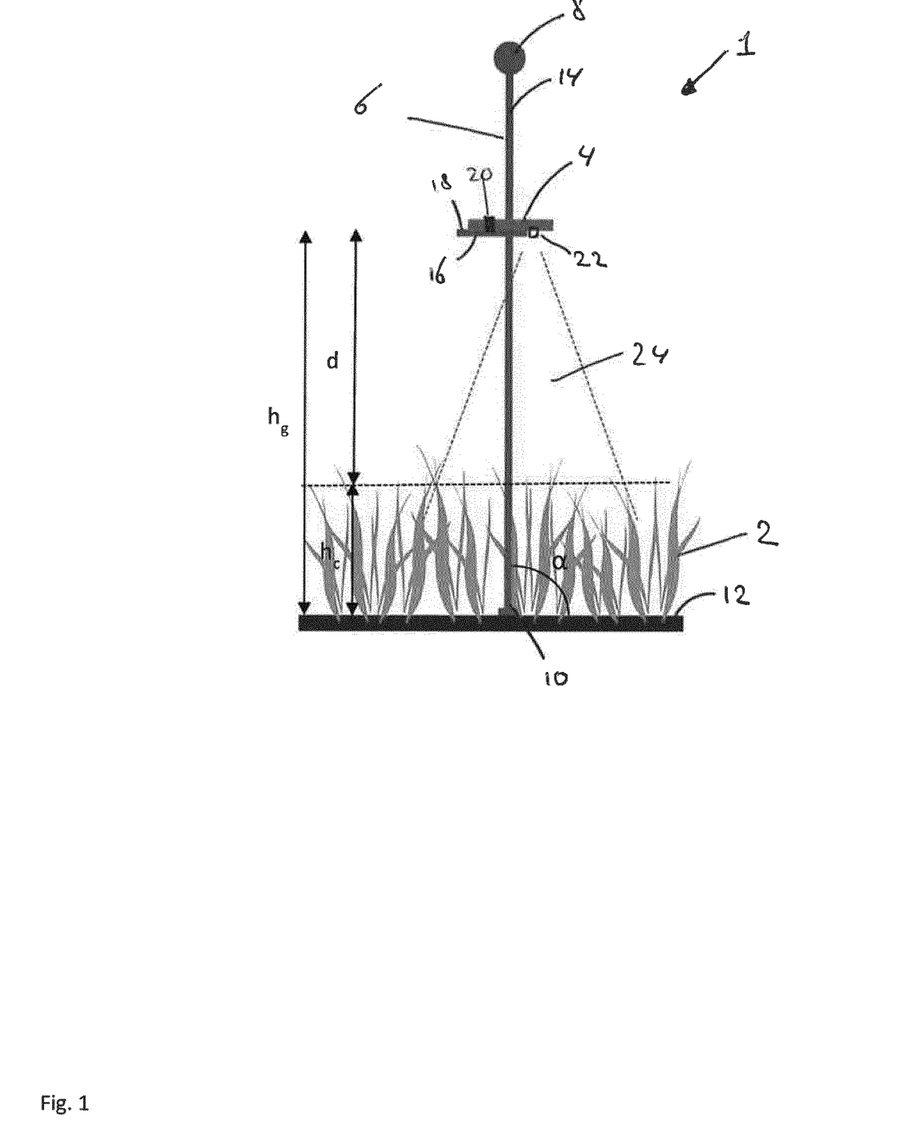
FIG. 1 shows a schematic representation of a system for determining a height of an agricultural product.

FIG. 1 shows a schematic representation of a system 1 for determining a height $h_c$ of an agricultural product 2. The system 1 includes a mobile communications device 4. In this example the mobile communications device 4 is a smartphone. The system 1 further includes a support 6. In this example, the support 6 is a hiking stick. The support 6 includes a handle 8 for holding the support 6 by hand. The support 6 includes a foot 10. The foot 10 is placed on the ground 12. In this example the support 6 includes a pole 14 extending from the foot 10 to the handle 8. The support 6 includes a mount 16. The mount 16 is arranged for mounting the mobile communications device 4 thereto. The mount 16 can e.g. include a resting surface 18 for resting the mobile communications device 4 thereon. The mount 16 can include a fastener 20, such as a hook-and-loop fastener, clamp, clip, elastic band, or the like, for fastening the mobile communications device 4 to the mount 16. In this example, the smartphone includes a built-in camera 22 (also see FIG. 6). The built-in camera here is a digital camera for obtaining visible images.

The system 1 as described in relation to FIG. 1 can be used as follows for measuring a height of the agricultural product 2 above the ground 12.

The mobile communications device 4 is mounted to the support 6 at a known position. In this known position the mobile communications device is positioned at a height $h_g$ from the bottom side of the foot 10. When holding the support 6 substantially upright the height of the mobile communications device 4 above the ground 12 will substantially correspond to the distance of the mobile communications device 4 to the bottom of the foot. In the upright position in this example the angle α between the ground 12 and the pole 14 is 90 degrees. It will be appreciated that the height of the mobile communications device 4 above the ground is differs by less than 1.5% from the distance between the mobile communications device 4 and the bottom of the foot 10 when the angle α is between 80 and 100 degrees. A deviation of less than ±10 degrees from perpendicular to the ground can easily be achieved. Hence, it normally suffices to position the support substantially upright, e.g. within ±10 degrees from perpendicular to the ground.

The mobile communications device 4 mounted to the support 6 is positioned above the agricultural product 2. A distance d between the mobile communications device 4 and agricultural product 2, i.e. between the mobile communications device 4 and a top of the agricultural product, is determined.

In this example, the distance d is determined by taking an image of the agricultural product 2 within a field of view 24 of the built-in camera 22 of the communications device 4, using the camera 22. When taking the image, an autofocus unit 26 of the mobile communications device 4 causes the image to be sharp. In this example, the autofocus unit 26 determines image contrast and changes an internal position of a lens 28 of the camera 22 while finding optimum image contrast. A focal distance of the camera 22 is related to the position of the lens within the camera. Hence, when the position of the lens within the camera is known, the focal distance, and thus here the distance d from the mobile communications device to the agricultural product is known. For some smartphones the distance at which the camera presently focusses is readily accessible, e.g. at a predetermined memory location of the mobile communications device. For some smartphones a lens position, or data representative thereof, focusses is readily accessible, e.g. at a predetermined memory location of the mobile communications device. In the latter case, the focal distance may be determined e.g. from a relationship, e.g. a look-up table, determined during a calibration of the camera for two or more focal distances.

Having determined the distance d between the mobile communications device 4 and the agricultural product 2, and knowing the height $h_g$ of the mobile communications device 4 above the ground 12, the height $h_c$ of the agricultural product can easily be determined by subtraction: $h_c = h_g - d$. It will be appreciated that a processor 30 of the smartphone 4 can be arranged for determining the distance d between the mobile communications device 4 and the agricultural product 2, and the height $h_e$ of the agricultural product. Thereto, the processor 30 may execute a dedicated piece of software, such as an app.

Figure 2:
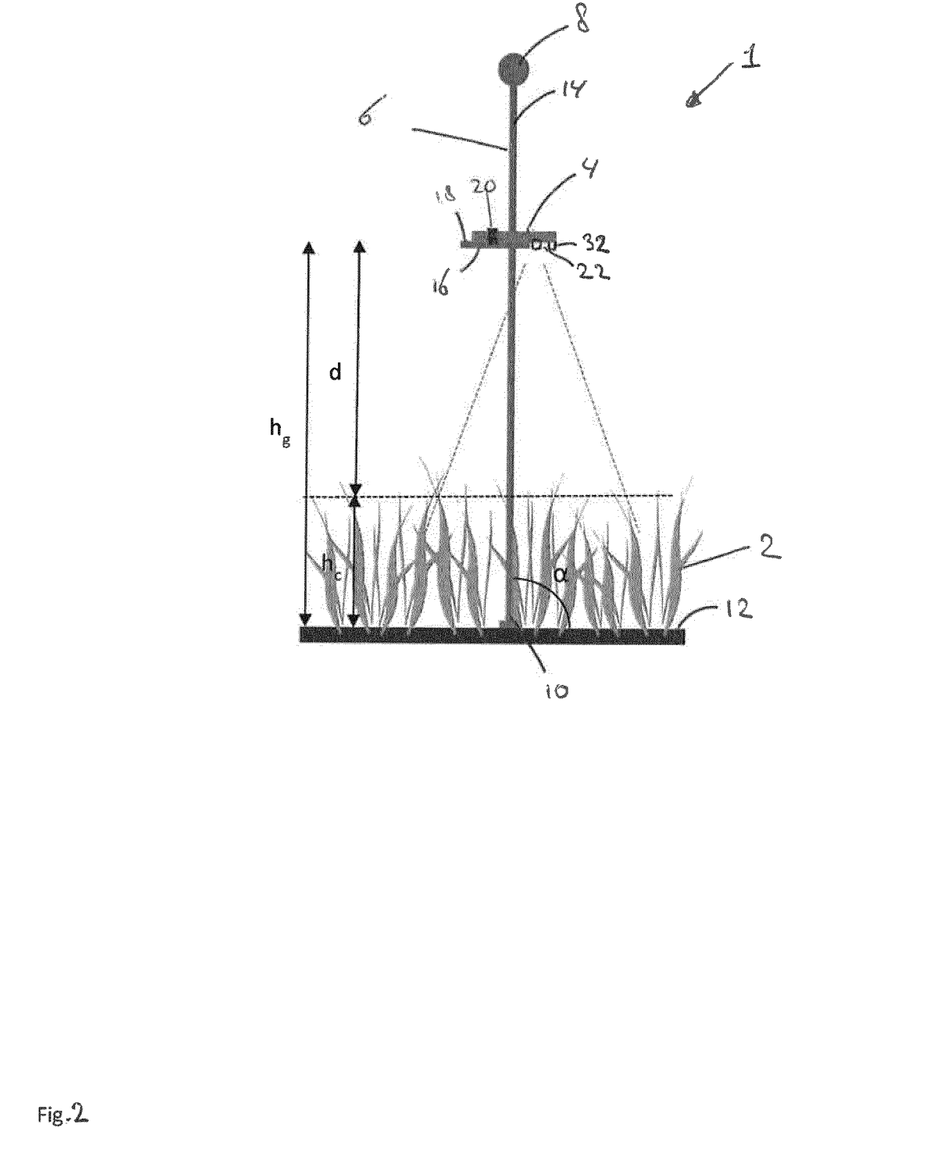
FIG. 2 shows a schematic representation of a system for determining a height of an agricultural product.

FIG. 2 shows a schematic representation of a system 1 for determining a height $h_c$ of an agricultural product 2, similar to the system described in relation to FIG. 1. In the example of FIG. 2 the smartphone 4 further includes a built-in flash light 32 (also see FIG. 6). The system 1 of FIG. 2 can be used as follows for measuring a height of the agricultural product 2 above the ground 12. The mobile communications device 4 mounted to the support 6 is positioned above the agricultural product 2. The mobile communications unit takes a first image and a second image of the agricultural product 2 using the built-in camera 22. The first image is taken while the flash light 32 illuminates the agricultural product 2. The second image is taken while the flash light 32 is switched off. By subtracting the second image from the first image to create a subtracted image, ambient lighting conditions are eliminated, and the effect of the illumination by the flash light 32 remains. It is noted that the intensity of the flash light decreases with the square of the distance to the flash light 32. Hence, the intensity with which the flash light 30 illuminates the agricultural product is inversely proportional to the square of the distance from the mobile communications device 4 to the agricultural product 2. Therefore, the distance can be determined on the basis of image intensity in the subtracted image, e.g. average image intensity. It will be appreciated that the image intensity may also depend on reflectivity of the agricultural product. Hence, calibration may be used for establishing a relationship between image intensity in the subtracted image and the distance d. An individual calibration may e.g. be performed for each individual agricultural product type. It will be appreciated that the processor 30 of the smartphone 4 can be arranged for determining the distance d between the mobile communications device 4 and the agricultural product 2, and the height $h_c$ of the agricultural product. Thereto, the processor 30 may execute a dedicated piece of software, such as an app.

Figure 3A:
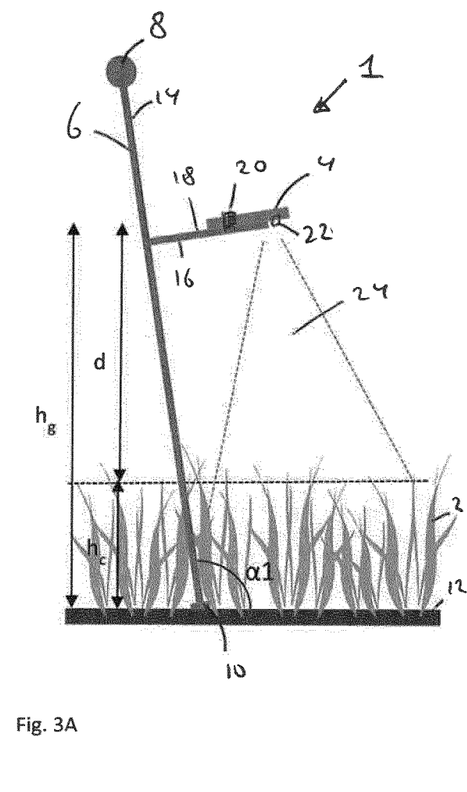
FIGS. 3A and 3B show a schematic representation of a system for determining a height of an agricultural product.
Figure 3B:
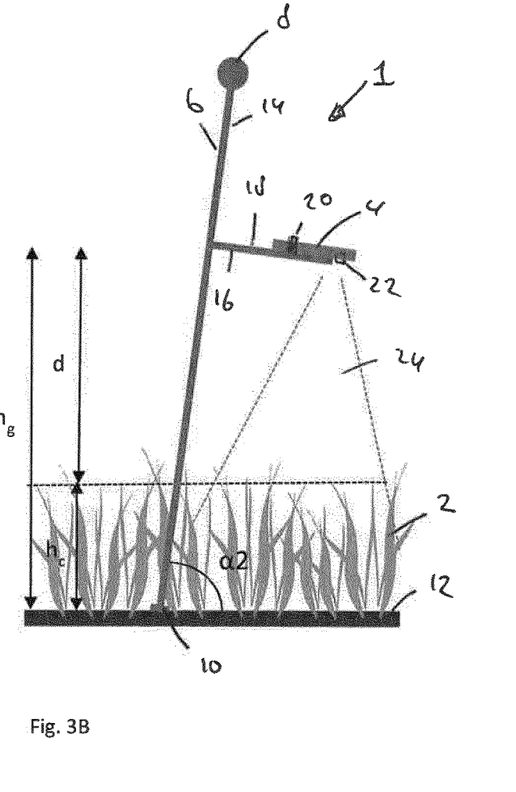

FIGS. 3A and 3B show schematic representations of a system 1 for determining a height $h_c$ of an agricultural product 2, similar to the system described in relation to FIG. 1. The mobile communications device 4 includes a built-in camera 22, here a digital camera for obtaining two-dimensional visible images. The system 1 of FIG. 3 can be used as follows for measuring a height of the agricultural product 2 above the ground 12. The mobile communications device 4 mounted to the support 6 is positioned above the agricultural product 2. The mobile communications unit takes a first image and a second image of the agricultural product 2 using the built-in camera 22. The first image is taken while the support 6 is at a first angle α1 relative to the ground 12. The second image is taken while the support 6 is at a second angle α2 relative to the ground 12. In this example the first angle is approximately 100 degrees. In this example, the second angle is approximately 80 degrees. The first image and the second image together form a stereographic image from which distance information can be retrieved. Methods for estimating a distance from a stereographic image are known per se. Such methods can e.g. include disparity between the first and second image.

Figure 6:
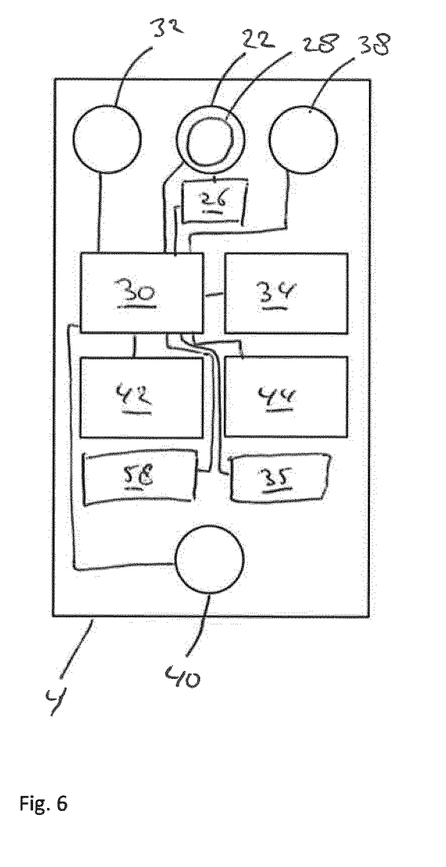
FIG. 6 shows a schematic representation of a device.

In the example, of FIGS. 3A and 3B the mobile communications device includes an inclinometer 34 (also see FIG. 6). The inclinometer 34 determines a tilt angle of the mobile communications device 4. Here, the processor 30 receives information representative of the inclination of the mobile communications device 4 from the inclinometer 34. The processor 30 monitors the inclination and instructs the camera 22 to obtain the first image when the inclination has a first value, or is within a first predetermined interval. The first inclination value or interval may correspond to the support 6 being at the first angle α1 relative to the ground 12. The processor 30 instructs the camera 22 to obtain the second image when the inclination has a second value, or is within a second predetermined interval. Thus, it is possible to obtain the first and second image while the camera is pointed at the agricultural product at two different angles. The second inclination value or interval may correspond to the support 6 being at the second angle α2 relative to the ground 12. Hence, the inclinometer 34 triggers the automatic taking of the first and second image, e.g. while walking.

It will be appreciated that the processor 30 of the smartphone 4 can be arranged for determining the distance d between the mobile communications device 4 and the agricultural product 2, and the height $h_c$ of the agricultural product. The processor can take the inclination of the support into account when determining the height $h_c$ of the agricultural product. Thereto, the processor 30 may execute a dedicated piece of software, such as an app.

Figure 4:
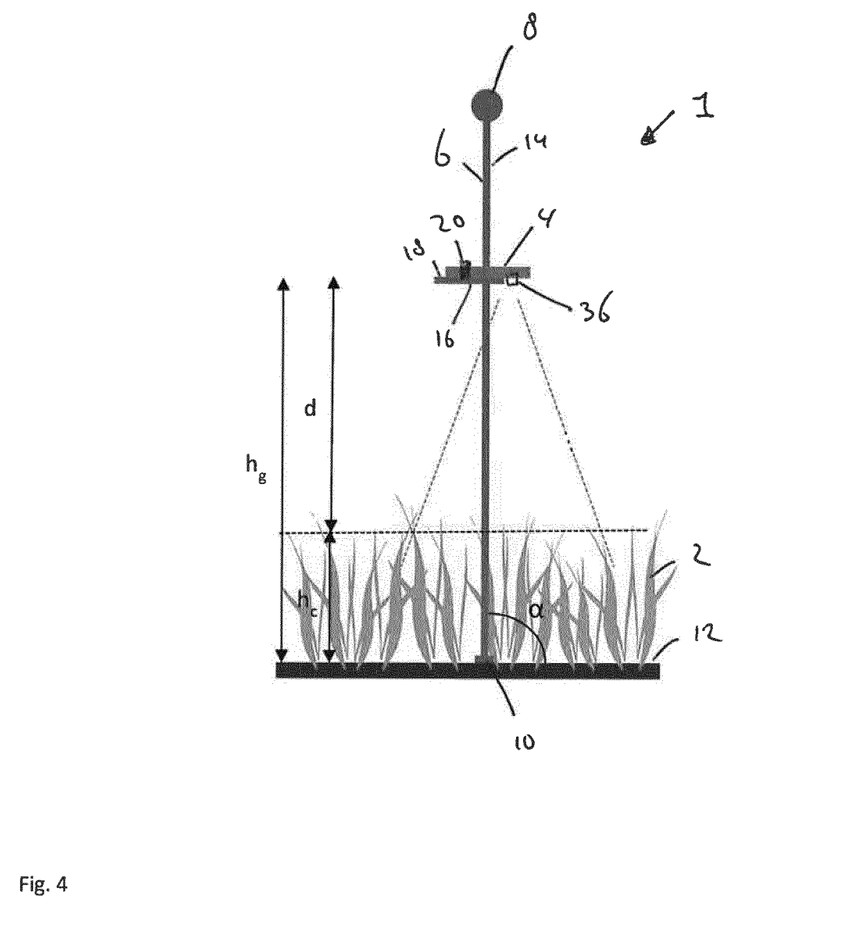
FIG. 4 shows a schematic representation of a system for determining a height of an agricultural product.

FIG. 4 shows a schematic representation of a system 1 for determining a height $h_c$ of an agricultural product 2, similar to the system described in relation to FIG. 1. In the example of FIG. 4 the smartphone 4 includes a built-in three-dimensional, 3D, camera 36. The 3D camera 36 can include two lenses and two image receivers. Alternatively, or additionally, the 3D camera can include a structured light source, such as a structured light or laser. The system 1 of FIG. 4 can be used as follows for measuring a height of the agricultural product 2 above the ground 12. The mobile communications device 4 mounted to the support 6 is positioned above the agricultural product 2. The mobile communications unit takes a 3D image of the agricultural product 2 using the built-in 3D camera 36. The processor 30 determines the distance d between the mobile communications unit 4 and the agricultural product 2 from the 3D image. It will be appreciated that the processor 30 of the smartphone 4 can be arranged for determining the distance d between the mobile communications device 4 and the agricultural product 2, and the height $h_c$ of the agricultural product. Thereto, the processor 30 may execute a dedicated piece of software, such as an app.

Figure 5:
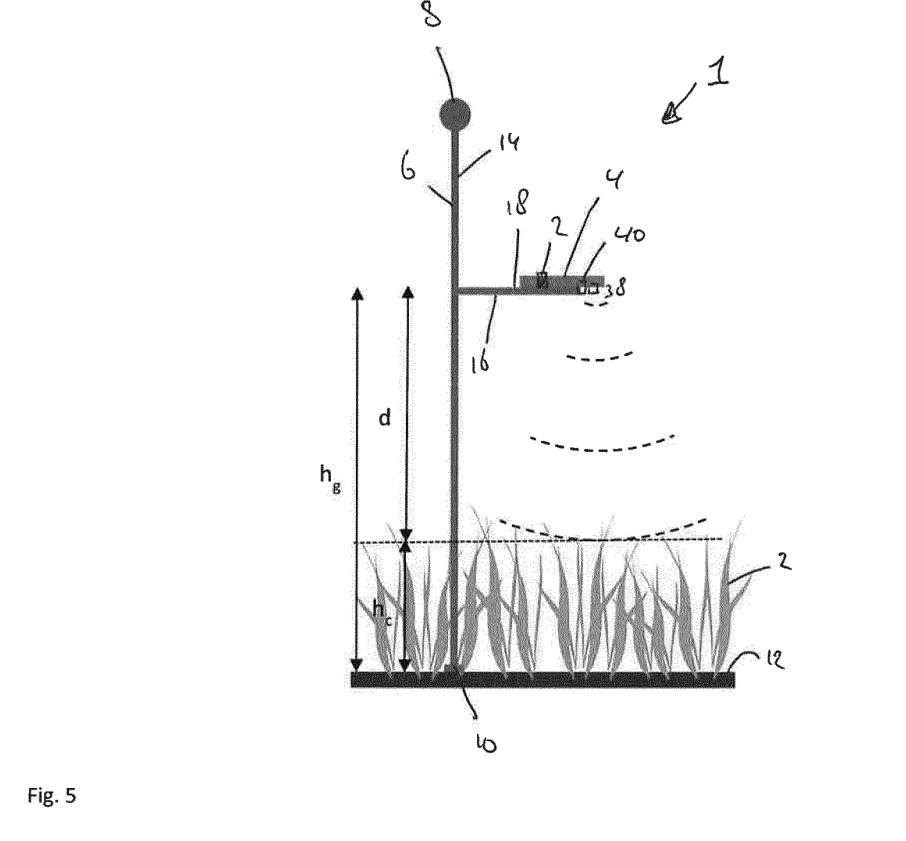
FIG. 5 shows a schematic representation of a system for determining a height of an agricultural product.

FIG. 5 shows a schematic representation of a system 1 for determining a height $h_c$ of an agricultural product 2, similar to the system described in relation to FIG. 1. In the example of FIG. 5 the smartphone 4 includes a built-in speaker 38 and a built-in microphone 40. The system 1 of FIG. 5 can be used as follows for measuring a height of the agricultural product 2 above the ground 12. The mobile communications device 4 mounted to the support 6 is positioned above the agricultural product 2. The mobile communications unit 4 emits a sound, such as a sound pulse, using the speaker 38. The sound can be an ultrasound. The sound reflects off the agricultural product 2. The microphone 40 receives the reflected sound. The processor 30 determines the distance d between the mobile communications unit 4 and the agricultural product 2 from the delay time between emission and reception of the sound. It will be appreciated that a calibration may be used for establishing a relationship between the delay time and the distance d. It will be appreciated that the processor 30 of the smartphone 4 can be arranged for determining the distance d between the mobile communications device 4 and the agricultural product 2, and the height $h_c$ of the agricultural product. Thereto, the processor 30 may execute a dedicated piece of software, such as an app.

It will be appreciated that the mobile communications device 4 can include a memory 42. The determined height of the agricultural product, or data representative thereof, can be stored in the memory 42. Alternatively, or additionally, the determined height of the agricultural product, or data representative thereof, can be stored in a remote database. The mobile communications unit 4 can be in communication with the database via a communications unit 44 of the mobile communications device 4.

In the example of FIGS. 3A and 3B the mobile communications device 4 includes an inclinometer 34. It will be appreciated that the mobile communications device 4 in the examples of FIGS. 1, 2, 4 and 5 can also include the inclinometer 34. In those examples, the inclinometer 34 can also trigger the taking of the image(s) or emission/reception of sound. There, the processor may monitor the inclination and instruct the camera or 3D camera to obtain the image(s) or the speaker 38 to emit the sound when the inclination has a third value, or is within a third predetermined interval. The third inclination value or interval may correspond to the support being substantially upright.

The communications device 4 can include an accelerometer 35. The accelerometer can sense acceleration of the device 4. Hence, the accelerometer 35 can for instance sense the positioning of the support 6 on the ground 12. Hence, the accelerometer can also be used for triggering the taking of the image(s) or the emission of sound instead of, or in addition to, the inclinometer.

Figure 7:
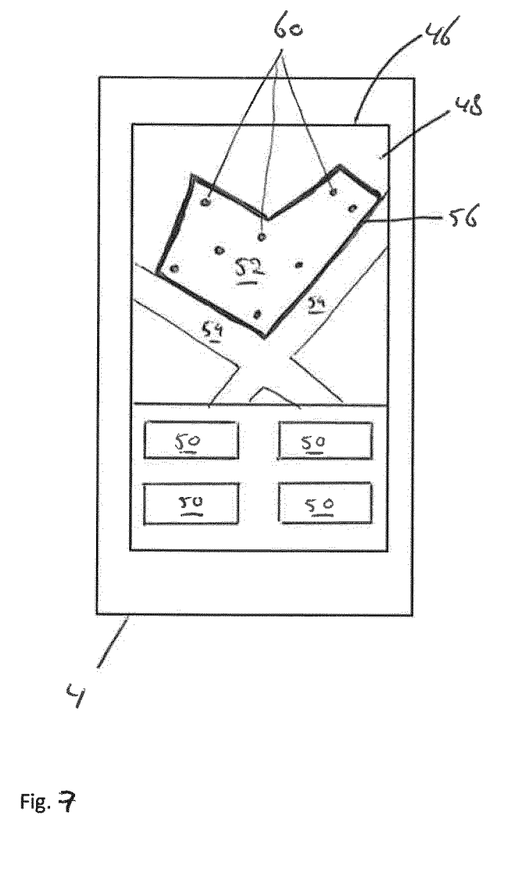
FIG. 7 shows a schematic representation of a device.

FIG. 7 shows an example of a mobile communications device 4. The device includes a display 46, in this example a touchscreen. The display is arranged for displaying a user interface 48. The user interface 48 includes one or more controls 50. The controls 50 can be activated to access functions of the device. One control may e.g. activate determining of a height $h_c$, e.g. including taking of required image(s). One control may e.g. activate a calibration. One control may e.g. access a results screen.

In this example, the user interface 48 includes a graphical representation including a representation of an area of land 52 on which the height of the agricultural product 2 is to be determined or has been determined. The graphical representation may e.g. include landmarks such as roads 54. The representation of the area of land may e.g. be shown in overlay on a map or aerial photograph. The perimeter 56 of the area of land 52 may be entered by a user of the device 4. The entering can be performed by drawing a perimeter contour around the area of land, e.g. on the map or aerial photograph. Alternatively, or additionally, it can be possible to demarcate the area of land by physically moving the mobile communications device 4 along the perimeter of the area of land, and storing locations, such as GPS coordinates, of the perimeter. Thereto, the device 4 can include a position determination unit 58, such as a GPS unit. Alternatively, or additionally, data representative of the perimeter of the area of land can be download by or uploaded to the mobile communications device or the database. Hence it is possible to identify an area of land, e.g. a predetermined pasture, in which the height of the agricultural product is to be determined.

When the height $h_c$ of the agricultural product 2 is determined, the determined height, or data representative thereof, can be stored in the memory 42 or the database. It is possible that a position, such as GPS coordinates, of the location where the height was determined, or data representative thereof, is stored together with the height (data).

The determined height $h_c$ can be indicated on the user interface 48. For example, the height can be indicated in the graphical representation, e.g. in false colours. Hence the representation of the area of land 52 can include one or more representations of measured heights $h_c$.

The mobile communications device 4 can be arranged for estimating a height of the agricultural product for any position within the area 52 on the basis of the height determined at one or more measurement locations 60. The estimating can include using interpolation and/or extrapolation. The height of the agricultural product can be interpolated between the height determined at the individual measurement locations 60. The height of the agricultural product between a measurement location 60 and the perimeter 56 of the area of land 52 can e.g. be estimated by extrapolation. Alternatively, or additionally, the height of the agricultural product 2 can be estimated by averaging of the individual determined heights at the measurement locations 60.

The processor 30 can be arranged for estimating a quantity of agricultural product within the area. The quantity, e.g. in kg DM or kg DM/ha, can e.g. be determined by multiplying the determined height by an empirical factor.

When the height $h_c$ of the agricultural product 2 is determined on at least two moments in time, the growth and/or growth rate of the agricultural product can be determined. From the growth and/or growth rate a nutritional status of the agricultural product can be determined.

Alternatively, or additionally, a nutritional status of the agricultural product can be determined from a leaf colour of the agricultural product. Since in the examples of FIGS. 1, 2, 3A, 3B and 4 already at least one image of the agricultural product is taken, leaf colour can be determined from that image. In the example of FIG. 5, additionally an image may be taken for determining the leaf colour.

The mobile communications device 4 may be in communication with an applicator system, such as a fertilizer system, irrigation system or the like. The nutritional status of the agricultural product 2 or a need for a particular nutrient and/or water, or data representative thereof, can be communicated to the applicator system. Hence the water and/or nutrients can be supplied to the agricultural product on the basis of the estimated nutritional status. It will be appreciated that the nutritional status can be determined in dependence of a position within an area of land 52, as described above for the height.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the support is arranged such that the mobile communications device is positioned beneath the handle. It will be appreciated that it is also possible that the support is arranges such that the mobile communications device is positioned above the handle. This can be convenient for determining a height of agricultural products that exceed a height where a human hand is comfortably positioned during walking, e.g. at about 120 cm above the ground. Hence, e.g. a height of agricultural products having a height of more than 120 cm, e.g. more than 150 cm, e.g. more than 200 cm can be determined.

In the example of FIG. 1, the autofocus unit determines focus on the basis of image contrast. It is also possible that the autofocus units uses light, e.g. infrared light, e.g. emitted by one or more LEDs, for determining a distance from the camera to an object. The one or more LEDs can produce a pulse of, e.g. infrared, light and the camera can measure the amount of light that is reflected back and/or the time it takes for the light to reflect back to the camera. From such measurements the autofocus unit can determine the distance d.

It is possible that the support is arranged for mounting the mobile communications device thereto at a plurality of different positions, at different distances from the ground. Thereto, the support may include a plurality of mounts. The different mounting positions can be associated with different measurement ranges. A first measurement range can e.g. for agricultural product heights of from 0 to 2 cm. A second measurement range can e.g. for agricultural product heights of from 1 to 30 cm. A third measurement range can e.g. for agricultural product heights of from 20 to 200 cm. However, other measurement ranges are possible.

In any of the examples, an inclination of the mobile communications device can be taken into account when determining the height of the agricultural product.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for measuring a height of an agricultural product above ground using a mobile communications device selected from the group consisting of a smartphone, a tablet and a laptop, the mobile communications device being mounted to a support at a constant distance from the ground, the support being selected from the group consisting of a walking stick, a boot and a leg, the method comprising:

positioning the mobile communications device above the agricultural product;

determining a distance between the mobile communications device and the agricultural product using a built-in sensor of the mobile communications device, wherein the built-in sensor is a camera; and determining the height of the agricultural product on the basis of the determined distance, wherein the camera is configured to be automatically triggered on the basis of an angular orientation of the mobile communications device and capture a first image when the mobile communications device is in a first angular position and to capture a second image when the mobile communications device is in a second angular position, the first and second images together forming a stereographic image, and wherein the distance is determined from the stereographic image.

2. The method according to claim 1, wherein the height is determined on the basis of one or more of:

focus distance information of an autofocus unit of the camera;

light intensity of light, generated by an illumination unit of the mobile communications device, reflected off the agricultural product; or distance information determined from a three dimensional image obtained by the camera.

3. The method according to claim 2, wherein the camera is a 3D-camera.

4. The method according to claim 1, wherein the built-in sensor is a first built-in sensor, the mobile communications device has a microphone as a second built-in sensor, and the height is determined on the basis of time-of-flight measurement of a sound generated by a speaker of the mobile communications device.

5. The method according to claim 1, further comprising calibrating the height determination on bare ground.

6. The method according to claim 1, further comprising storing a record including data representative of the determined height in a memory of the mobile communications device and/or in a database in communication with the mobile communications device.

7. The method according to claim 6, further comprising determining a position of the mobile communications device, using a built-in position determining unit, and storing data representative of the position in the record.

8. The method according to claim 6, further comprising determining the height at a plurality of positions and storing a record for each of the positions.

9. The method according to claim 1, further comprising storing, in a memory of the mobile communications device and/or in a database in communication with the mobile communications device, data representative of an area of land on which the height of the agricultural product is to be determined.

10. The method according to claim 8, further comprising estimating a height of the agricultural product for any position within an area on the basis of the height determined at the plurality of positions.

11. The method according to claim 10, further comprising estimating a quantity of agricultural product within the area.

12. The method according to claim 1, further comprising estimating a nutritional status of the agricultural product on the basis of a first height determined at a first moment in time and a second height determined at a second moment in time.

13. The method according to claim 12, further comprising supplying water and/or nutrients to the agricultural product on the basis of the estimated nutritional status.

14. The method according to claim 1, further comprising estimating an optimum moment for harvesting and/or mowing of the agricultural product on the basis of a first height determined at a first moment in time and a second height determined at a second moment in time.

15. The method for measuring a quantity of an agricultural product the method comprising:

determining the height of the agricultural product according to claim 1; and calculating, using a processing unit of the mobile communications device, the quantity of the agricultural product on the basis of the determined height.

16. A mobile communications device selected from the group consisting of a smartphone, a tablet and a laptop and having a built-in sensor and a processing unit arranged for:

determining a distance between the mobile communications device and an agricultural product above which the communication device is held using the built-in sensor of the mobile communications device; and determining a height of the agricultural product on the basis of the determined distance, wherein the built-in sensor is a camera, and wherein the camera is configured to be automatically triggered on the basis of an angular orientation of the mobile communications device and capture a first image when the mobile communications device is in a first angular position and to capture a second image when the mobile communications device is in a second angular position, the first and second images together forming a stereographic image, distance information being determined from the stereographic image obtained by the camera.

17. The mobile communications device according to claim 16, wherein the processing unit is arranged for determining the height on the basis of one or more of:

focus distance information of an autofocus unit of the camera;

light intensity of light, generated by an illumination unit of the mobile communications device, reflected off the agricultural product; or distance information determined from a three dimensional image obtained by the camera.

18. The mobile communications device according to claim 17, wherein the camera is a 3D-camera.

19. The mobile communications device according to claim 18, wherein the built-in sensor is a first built-in sensor, the mobile communications device has a microphone as a second built-in sensor, and the processing unit is arranged for determining the height on the basis of time-of-flight measurement of a sound generated by a speaker of the mobile communications device.

20. The mobile communications device according to claim 16, including a memory and/or being arranged for being in communication with a database, wherein the processing unit is arranged for storing a record including data representative of the determined height in the memory and/or database.

21. The mobile communications device according to claim 20, further comprising a position determining unit, wherein the processing unit is arranged for storing data representative of the position of the mobile communications device in the record.

22. A system including the mobile communications device according to claim 16, and a support for supporting the mobile communications device at a predetermined distance above the ground, wherein the support is selected from the group consisting of a walking stick, a boot and a leg.

* * * * *